US005629094A

United States Patent [19]

Sakakibara et al.

[11] Patent Number: 5,629,094

[45] Date of Patent: May 13, 1997

[54] IMAGE TRANSFER MEDIUM CARRIER MEMBER AND IMAGE FORMING APPARATUS INCORPORATING THE SAME

[75] Inventors: Teigo Sakakibara, Yokohama; Kiyoshi Sakai, Hachiouji; Yuichi Hashimoto, Tokyo; Katsumi Aoki, Yokohama, all of Japan

[73] Assignee: Canon Kabushiki Kaisha, Tokyo, Japan

[21] Appl. No.: 378,951

[22] Filed: Jan. 27, 1995

[30] Foreign Application Priority Data

Jan. 31, 1994 [JP] Japan .................................. 6-027447

[51] Int. Cl.$^6$ .......................... B32B 27/36; G03G 5/06; G03G 15/14

[52] U.S. Cl. ........................ 428/447; 428/413; 428/451; 428/480; 428/483; 399/388

[58] Field of Search .................................. 428/412, 413, 428/423.3, 423.7, 421, 422, 431, 447, 480, 483; 355/272, 274, 309

[56] References Cited

U.S. PATENT DOCUMENTS

| | | | |
|---|---|---|---|
| 4,716,091 | 12/1987 | Yoshihara et al. | 430/66 |
| 5,327,200 | 7/1994 | Sakikibara et al. | 355/274 |
| 5,391,429 | 2/1995 | Otani et al. | 428/327 |

FOREIGN PATENT DOCUMENTS

| | | |
|---|---|---|
| 0300426 | 1/1989 | European Pat. Off. . |
| 0510643 | 10/1992 | European Pat. Off. . |
| 0525785 | 2/1993 | European Pat. Off. . |
| 0578092 | 1/1994 | European Pat. Off. . |
| 58-167606 | 10/1983 | Japan . |
| 59-126478 | 7/1984 | Japan . |

*Primary Examiner*—D. S. Nakarani
*Attorney, Agent, or Firm*—Fitzpatrick, Cella Harper & Scinto

[57] ABSTRACT

An image transfer medium carrier member, for carrying an image transfer medium such as a recording paper sheet, has a substrate and a surface layer. The surface layer containing a polyester resin and a cured resin. An image forming apparatus comprises: an electrophotographic photosensitive member; a charging device for electrostatically charging the electrophotographic photosensitive member; an image exposure device for exposing the electrophotographic photosensitive member to an image light so as to form an electrostatic latent image in the electrophotographic photosensitive member; a developing device for developing the electrostatic latent image with a toner so as to produce a toner image; and the above-mentioned image transfer medium carrier member.

8 Claims, 4 Drawing Sheets

IMAGE TRANSFER MEDIUM CARRIER MEMBER AND IMAGE FORMING APPARATUS INCORPORATING THE SAME

BACKGROUND OF THE INVENTION

1. Field of the Invention

The present invention relates to an image transfer medium carrier member for carrying a sheet or other type of member or medium to which an image to be recorded is transferred. The invention also is concerned with an image forming apparatus which incorporates such an image transfer medium carrier member.

2. Description of the Related Art

Nowadays, various types of image forming apparatuses are widely used, such as electrophotographic copying apparatuses, printers, and so forth. Such an image forming apparatus generally uses an image transfer medium such as a recording paper sheet or a plastic film to which a toner or ink is transferred to form an image to be recorded. During the recording, the image transfer medium is carried by a member which in this specification is referred to as an "image transfer medium carrier member".

The image transfer medium carrier member, when used in an apparatus such as an electrophotographic apparatus for example, is subjected to various mechanical and electric forces during the image forming and recording process including conveyance of the image transfer medium, charging for the image transfer, elimination of electrostatic charges, cleaning, and so on. The image transfer medium carrier member, therefore, is required to have durability and strength, both mechanically and electrically, as well as resistance to wear. Furthermore, the member also has to have excellent lubricating nature, as it is frictionally contacted by cleaning member.

In recent years, it has become a common practice to use, as a developing agent, a so-called fine toner having particle sizes not greater than 10 μm, about 8 μm in mean particle size. The use of such a fine toner requires a more strict conditions of cleaning, i.e., the work for removing such a fine toner from the image transfer medium, since it is not easy to remove such a fine toner.

Hitherto, various types of plastic films have been used as the materials of the image transfer medium carrier member, such as Teflon, polyester, polyvinylidene fluoride, triacetate, polycarbonate or the like.

It has been reported that conventional image transfer medium carrier member tends to be cracked by mechanical or electrical external force, or due to deposition of a machine oil. Any crack formed in the carrier member causes a local change in the electric characteristics, which undesirably allowed generation of defects such as transfer unevenness (non-uniform transfer of toner) or a local omission of transfer (generation of area where toner is not transferred at all).

As a measure for solving such problems, it has been reported to form, on the surface of the image transfer medium carrier member, a coating layer of, for example, a polyester resin. This solution, however, is still unsatisfactory, since voids or pin-holes tend to be generated in the surface coating layer to degrade the quality of the transferred image. In addition, the surface coating layer is worn down during repeated use, with the result that the clear image cannot be obtained.

SUMMARY OF THE INVENTION

Accordingly, an object of the present invention is to provide a durable image transfer medium carrier member which exhibits reduced tendency of cracking against deposition of machine oil and against application of mechanical or electrical external force.

It is also an object of the present invention to provide an image forming apparatus which makes use of such a durable image transfer medium carrier member.

To this end, according to one aspect of the present invention, there is provided a carrier member for carrying an image transfer medium, comprising a substrate and a surface layer, wherein the surface layer comprises a polyester resin and a cured resin.

According to another aspect of the present invention, there is provided an image forming apparatus, comprising: an electrophotographic photosensitive member; charging means for charging the electrophotographic photosensitive member; image exposure means for allowing the charged electrophotographic photosensitive member to be exposed to an image light so as to form an electrostatic latent image on the surface of said electrophotographic photosensitive member; developing means for developing the electrostatic latent image with a toner so a to form a toner image which is visible; and an image transfer medium carrier member for carrying an image transfer medium to which the developed toner image is to be transferred, the image transfer medium carrier member having the construction described above.

The above and other objects, features and advantages of the present invention will become clear from the following description of the preferred embodiments when the same is read in conjunction with the accompanying drawings.

DESCRIPTION OF THE PREFERRED EMBODIMENTS

Figure 1:
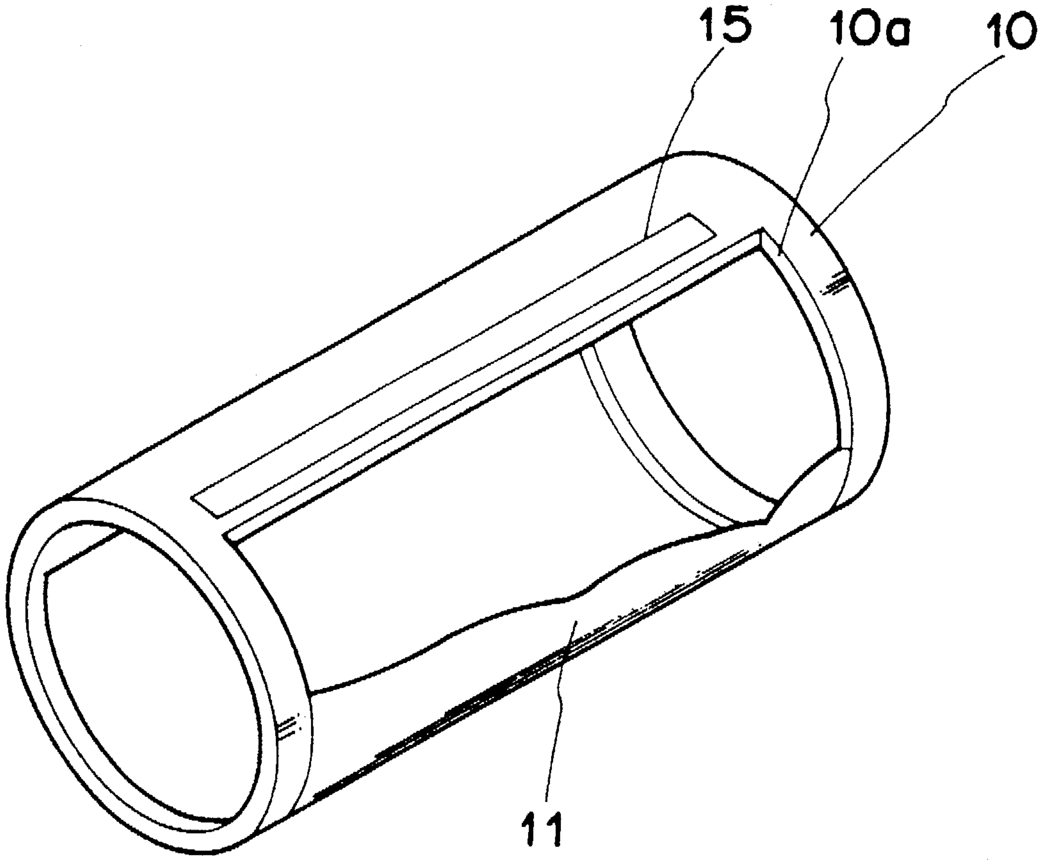
FIG. 1 is a perspective view of a cylinder to which is attached an image transfer medium carrier member embodying the present invention.

The image transfer medium carrier member of the present invention has a substrate and a surface layer, wherein the surface layer contains a polyester resin and a cured resin.

The surface layer also may contain silicone-type graft polymer.

The surface layer may be formed either on only one side or on both sides of the substrate.

The polyester resin may be a polymer which is formed through condensation of an acidic component and a glycol component.

Examples of the acidic components suitably used are: aromatic dicarboxylic acids such as terephthalic acid, isophthalic acid, naphthalene carboxylic acid and so forth; aliphatic dicarboxylic acids such as succinic acid, adipic acid, sebacic acid and so forth; alicyclic dicarboxylic acids such as hexahydroterephthalic acid an so forth; and oxycarboxylic acids such as hydroethoxybenzoate.

Examples of the glycol components suitably used are ethylene glycol, trimethylene glycol, tetramethylene glycol, hexamethylene glycol, cyclohexane dimethylol, polyethylene glycol, polypropylene glycol, and so forth.

The polyester resin used in the present invention preferably has a high molecular number. More specifically, the polyester resin has molecular weight which is preferably not less than 0.4 dl/g, more preferably not less than 0.5 dl/g, most preferably not less than 0.65 dl/g, in terms of intrinsic viscosity which is a parameter corresponding to viscosity-average molecular weight, when measured at 36° C. in orthochlorophenol.

The polyester resin used in the present invention has a melting point which is preferably not lower than 160° C., more preferably not lower than 200° C.

The polyester resin having a high melting point exhibits a high degree of crystallinity, allowing tight and intimate entanglement between polymer chains of the polyester resin and the polymer chains of the cured resin, thus offering improved durability of the surface layer. The melting point mentioned in this specification is the melting point as measured by DSC.

Although not exclusive, a polyalkylene terephthalate resin or a polyalkylene naphthalate resin can suitably used as the polyester resin having the high melting point. The polyalkylene terephthalate resin contains terephthalic acid as the acidic component and alkylene glycol as the glycol component. The polyalkylene naphthalate resin contains naphthalene carboxylic acid as the acidic component and alkylene glycol as the glycol component.

Examples of the polyalkylene terephthalate resin suitably used are: polyethylene terephthalate (PET) mainly composed of terephthalic acid and ethylene glycol; polybutylene terephthalate (PBT) mainly composed of terephthalic acid and 1,4-tetramethylene glycol (1,4-butylene glycol); polycyclohexyl dimethylmethylene terephthalate (PCT) mainly composed of terephthalic acid and cyclohexane dimethylol; and so forth.

Examples of the polyalkylene naphthalate resin suitably used are: polyethylene naphthalate (PEN) mainly composed of naphthalene dicarboxylic acid and ethylene glycol; and so forth.

The polyester resin may be formed by copolymerization of multifunctional compounds such as pentaerythritol, trimethylol propane, pyromellitic acid and their derivatives, provided that the copolymer is a substantially linear polymer.

The curable resin used as the material of the cured resin used in the present invention is a resin which is polymerizable or cross-linkable under application of light or heat.

An ion-polymerizable resin or an ion-cross-linkable resin is used when the material of the cured resin is a photocurable resin. Ion-polymerizable or ion-cross-linkable resin can be cured by polymerization or cross-linking without being impeded by oxygen in the air, so that it can provide a surface layer which has excellent durability.

Examples of the curable resin suitably used in the invention are an epoxy resin, an urethane resin, phenol resin, melamine resin, acrylic resin, silicone resin and so forth, among which a cation-polymerizable resin is used advantageously.

Such a cation-polymerizable resin is preferably those which are mainly composed of epoxy resins having two or more oxirane rings in each molecule.

A bisphenol-type epoxy resin, novolk-type epoxy resin, alicyclic epoxy resin, butadiene epoxy resin and so forth can suitably be used as the above-mentioned epoxy resin.

Examples of the bisphenol-type epoxy resin are: EPICOAT 828, EPICOAT 834, EPICOAT 836, EPICOAT 1001, EPICOAT 1004, EPICOAT 1007, EPICOAT 190P and EPICOAT 191P (tradenames, sold from Yuka Shell Epoxy Co., Ltd.); DER 31, DER 332, DER 661, DER 664 and DER 667 (tradenames, sold from Dow Chemical); and ARALDITE 260, ARALDITE 280, ARALDITE 6071, ARALDITE 6084 and ARALDITE 6097 (tradenames, sold from Ciba Geigy). Each of these hisphenol epoxy resins may be used alone or two or more of them may be used in the form of a mixture.

Examples of the novolak epoxy resin are: EPICOAT 152 and EPICOAT 154 (tradenames, sold from Yuka-Shell Epoxy Co., Ltd.); ARALDITE EPN 1138, ARALDITE EPN 1139, ARALDITE ECN 1235, ARALDITE ECN 1273, ARALDITE ECN 1280 and ARALDITE ECN 1299 (tradenames, sold from Ciba Geigy). Each of these novolak epoxy resins may be used alone or two or more of them may be used in the form of a mixture.

Examples of the alicyclic epoxy resin are: EPICOAT 190 P and EPICOAT 191 P (tradenames, sold from Yuka-Shell-Epoxy Co., Ltd.); ARALDITE CY 175, ARALDITE CY 177, ARALDITE CY 179 and ARALDITE CY 192 (tradenames, sold from Ciba Geigy); and ERL 4221, ERL 4229 and ERL 4234 (tradenames, sold from Union Carbides). Each of these novolak epoxy resins may be used alone or two or more of them may be used in the form of a mixture.

The cation-polymerizable compound used in the present invention may contain a monofunctional epoxy diluent, by an amount which does not substantially impair the curability. Examples of such a monofunctional epoxy diluent are phenyl glycidylether and t-butyl glycidylether.

It is possible to use a cation-polymerizable vinyl compound, by mixing it with the above-mentioned epoxy resin. Examples of such cation-polymerizable vinyl compound are styrene, allylbenzene, triallylisocyanate, triallylcyanate, vinylether, N-vinylcarbazole and N-vinylpyrrolidone.

The curing of the curable resin for forming the cured resin may be conducted by application of heat, although photocuring by irradiation with ultraviolet rays is preferably adopted.

A photopolymerization initiator or a heat-polymerization initiator may be used as required in conducting the curing of the curable resin. Such a photopolymerization initiator, when irradiated with ultraviolet rays, frees Lewis acid which initiate polymerization of a cation-polymerizable compound. Examples of such photopolymerization initiator are an aromatic diazonium salt, aromatic halonium salt, and a photosensitive aromatic onium salt of an element of Group VIb or Vb. The heat-polymerization initiator may be an organic metal salt, organic metal salt complex, acid anhydride, amine, and so forth.

The silicone graft polymer suitably used in the invention is of the type in which side chains containing silicon are connected in the form of branches to a main chain. Such a silicone graft polymer can be obtained through a copolymerization of a denaturated silicone having silicone in its side chain and a polymerizable functional group at its end with a compound having a polymerizable functional group.

The denaturated silicone can be obtained by condensation reaction between a compound of the following general formula (I) or (II) and a compound of the following general formula (III). The denaturated silicone also may be formed by causing both of the compounds of the general formulae (I) and (II) with the compound of the general formula (III).

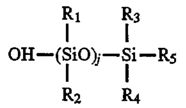

(I)

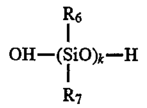

(II)

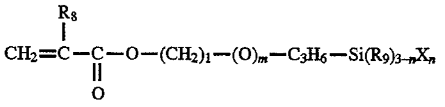

(III)

$R_1$ to $R_7$ and $R_9$ each represents an alkyl group or an aryl group. $R_8$ represents a hydrogen atom, an alkyl group, an aryl group or an aralkyl group, Symbol X indicates a halogen atom or an alkoxy group. Symbols j and k are positive integers which are from 1 to 1000, preferably from 10 to 500. Symbol l represents an integer of from 0 to 10, preferably from 0 to 4. Symbol m indicates 0 or 1. Symbol n indicates an integer of from 1 to 3.

As the aryl group indicated by $R_1$ to $R_9$, a methyl group, ethyl group, propyl group or a butyl group is preferably used.

As the aryl group indicated by $R_1$ to $R_9$, a phenyl group or a naphthyl group is preferably used.

As the aralkyl group indicated by $R_8$, a benzyl group, a phenetyl group or a phenylpropyl group is preferably used.

The halogen atom indicated by X may be atom of fluorine, chlorine, bromine or iodine, among which chlorine is preferred.

As the alkoxy group indicated by X, a methoxy group, an ethoxy group, a propoxy group or a butoxy group is preferably used, among which a methoxy group, an ethoxy group or 2-methoxy-ethoxy group are used more preferably.

$R_1$ to $R_9$ may have a substituting group which preferably is a halogen atom such as of fluorine, chlorine, bromine or the like, an alkyl group such as methyl, ethyl or propyl group, or an alkoxy group such as methoxy group, ethoxy group, propoxy group or the like.

The alkoxy group indicated by X also can have a substituting group which may be the same as the substituting group of $R_1$ to $R_9$.

Preferred compositions expressed by the general formulae (I) to (III) are shown below, by way of example.

Examples of Composition of General Formula (I)

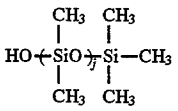

1.

-continued

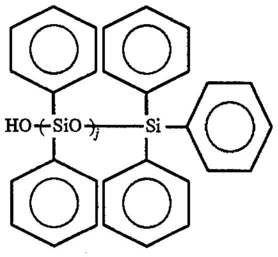

2.

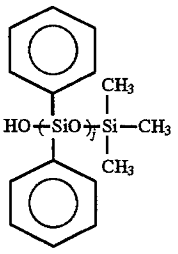

3.

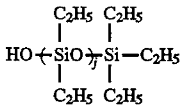

4.

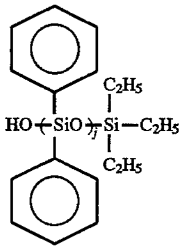

5.

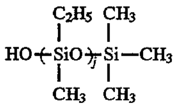

6.

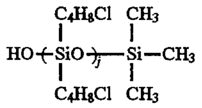

7.

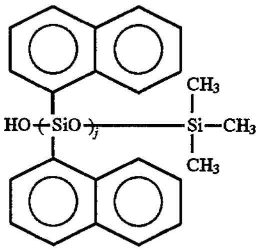

8.

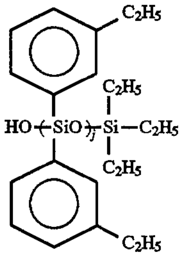

9.

-continued
10.
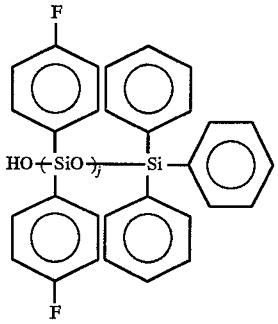
11.
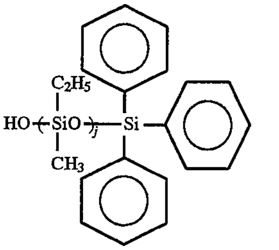
12.
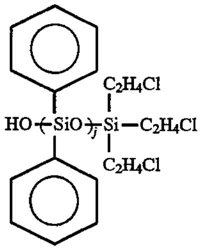
13.
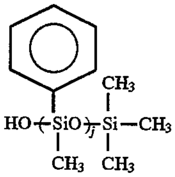
14.
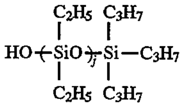
15.
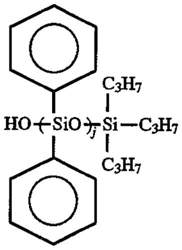
16.
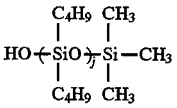
17.
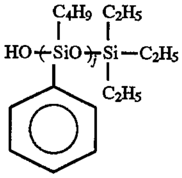
-continued
18.
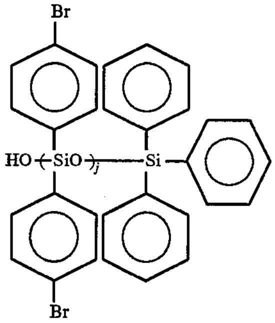
19.
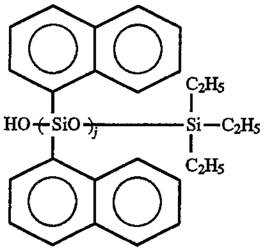
20.
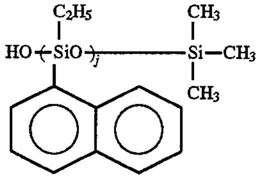
21.
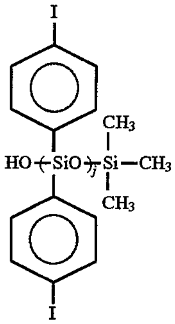
22.
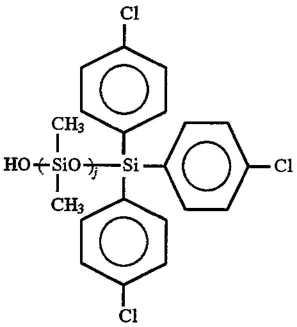

-continued
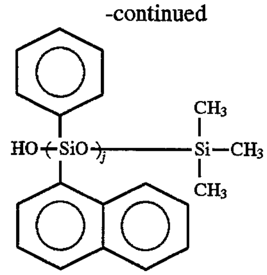
23.
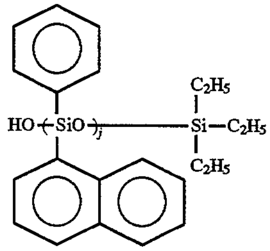
24.
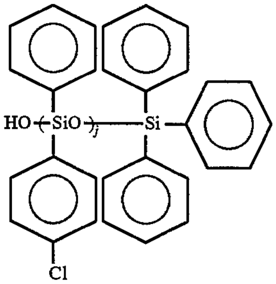
25.
Examples of Compositions of General Formula (II)
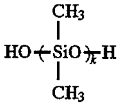
26.
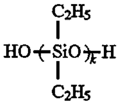
27.
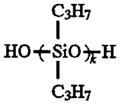
28.
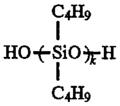
29.
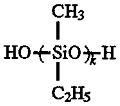
30.
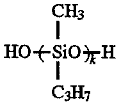
31.
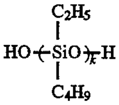
32.
-continued
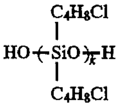
33.
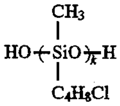
34.
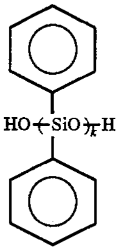
35.
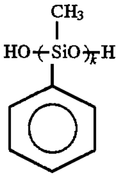
36.
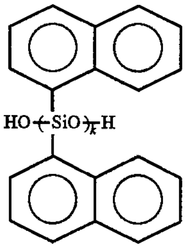
37.
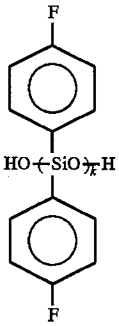
38.
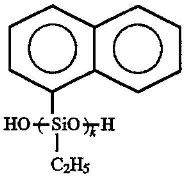
39.

-continued
40.
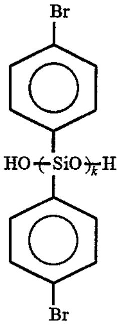
41.
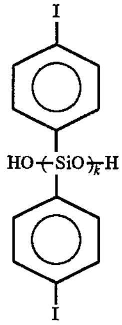
42.
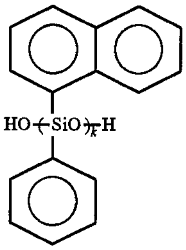
Examples of Composition of General Formula (III)
43.
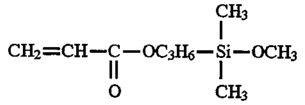
44.
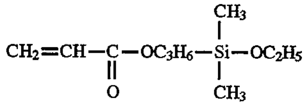
45.
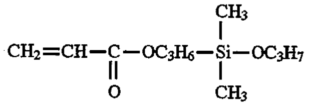
46.
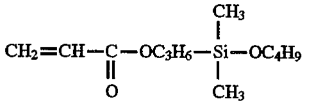
47.
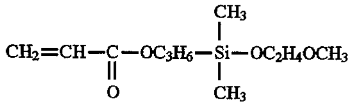
48.
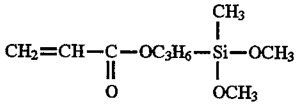
-continued
49.
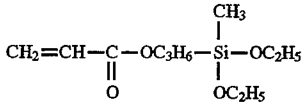
50.
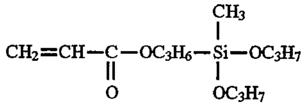
51.
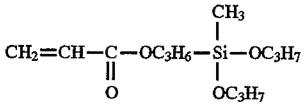
52.
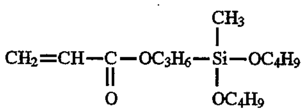
53.
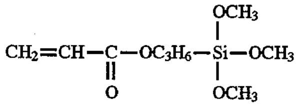
54.
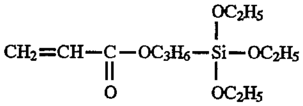
55.
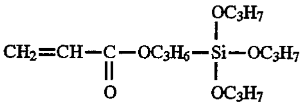
56.
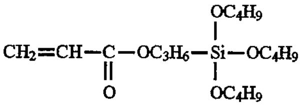
57.
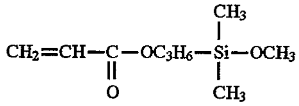
58.
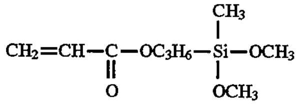
59.
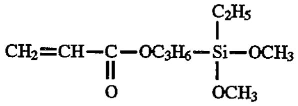
60.
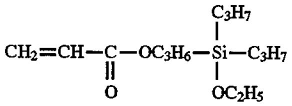
61.
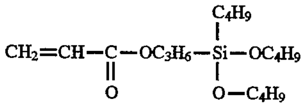
62.
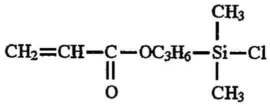

-continued
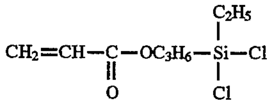
63.
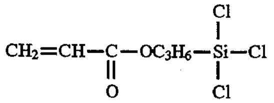
64.
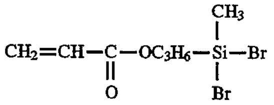
65.
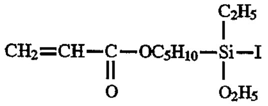
66.
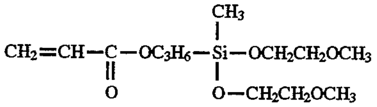
67.
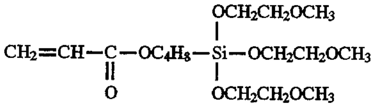
68.
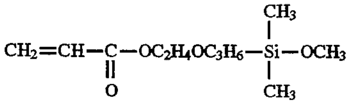
69.
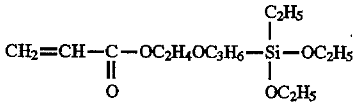
70.
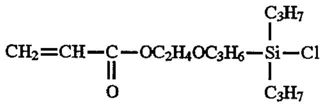
71.
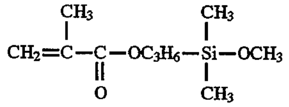
72.
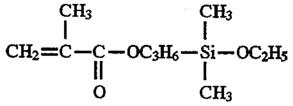
73.
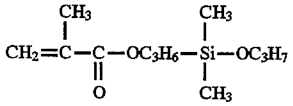
74.
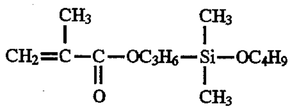
75.
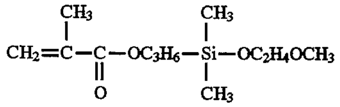
76.
-continued
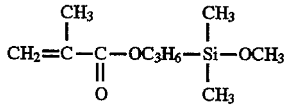
77.
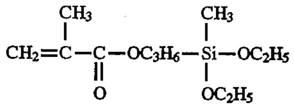
78.
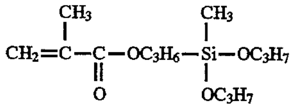
79.
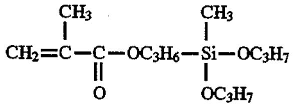
80.
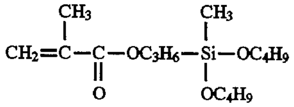
81.
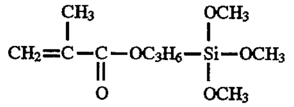
82.
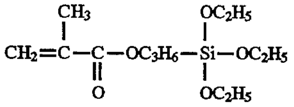
83.
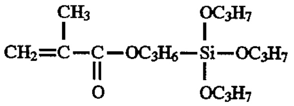
84.
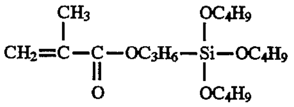
85.
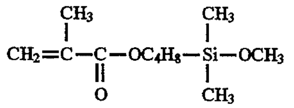
86.
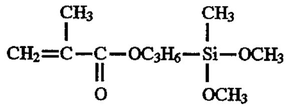
87.
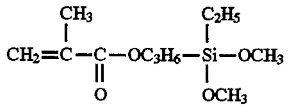
88.
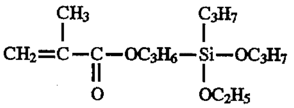
89.
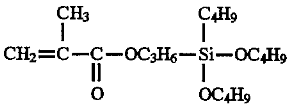
90.

-continued

91. 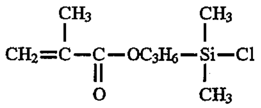

92. 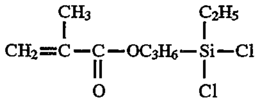

93. 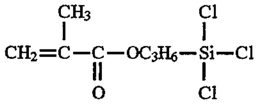

94. 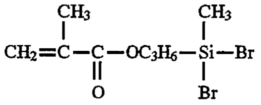

95. 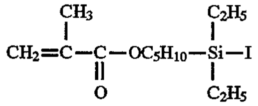

96. 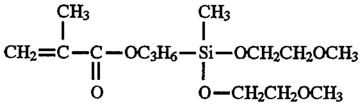

97. 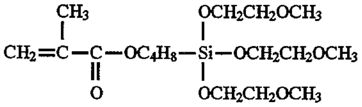

98. 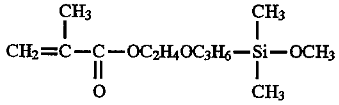

99. 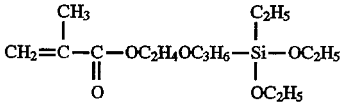

100. 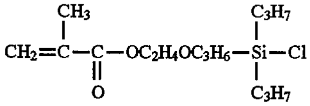

101. 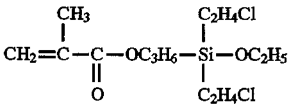

102. 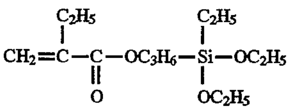

103. 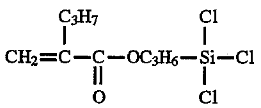

104. 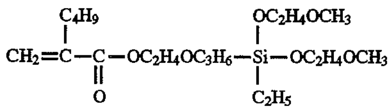

-continued

105. 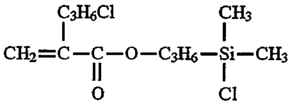

106. 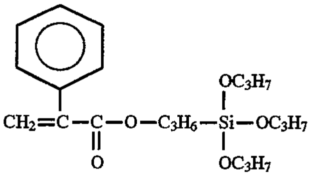

107. 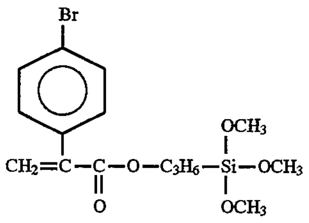

108. 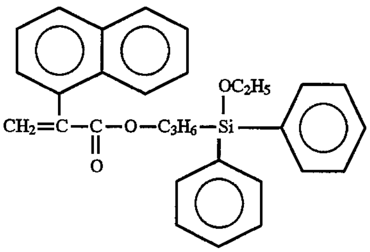

109. 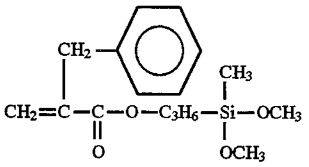

110. 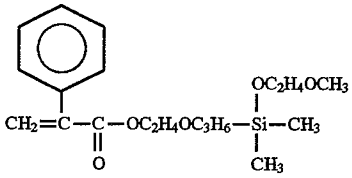

The condensation reaction of the compositions shown by the general formulae (I) to (III) is conducted while the reaction mole ratio and the reaction conditions are controlled in a manner shown in Japanese Patent laid-Open No. 58-167606 or Japanese Patent Laid-Open No. 59-126478, so that a stable denaturated silicone can be obtained.

For example, a polymerizable monomer having no silicon atom, as well as a macromonomer composed of a polymer of a comparatively small molecular weight, having no silicon atom but a polymerizable functional group at the end, can be used as the compound having a polymerizable functional group copolymerizable with the denaturated silicone. Preferably, the molecular weight of the macromonomer is from 1000 to 10,000 in terms of number-average molecular weight. In the description in this specification, the number-average molecular weight values are those obtained through measurement by a GPC (Gel permeation Chromatography).

Examples of the above-mentioned polymerizable monomer or macromonomer, preferably used in the invention, are: a straight-chain unsaturated hydrocarbon such as ethylene, propylene or butylene; a vinyl halide such as vinyl chloride or vinyl fluoride; a vinyl ester of an organic acid such a vinyl acetate; a vinyl aromatic compound such as styrene, vinyl pyridine or vinyl naphthalene; an acrylic acid, a methacrylic acid, ester of such acid, a derivative of such an acid containing amide or acrilonitrile; an N-vinyl compound such as N-vinyl carbazole, N-vinylpyrrolidone or N-vinyl caprolactam; a vinyl silicone compound such as vinyl triethoxysilane; a substituted ethylene such as vinylidene fluoride or vinylidene chloride; maleic anhydride; and an ester of maleic acid or fumaric acid.

A radical polymerization method or an ion polymerization method such as solution polymerization method, suspension polymerization method or bulk polymerization method can be used as the method of polymerizing silicone graft polymer, among which radical polymerization by solutio polymerization is used most advantageously.

The copolymerization ratio preferably ranges from 5 to 90 wt %, more preferably from 10 to 70 wt %, in terms of the content of the denaturated silicone the silicone graft polymer. The molecular weight of the silicone graft polymer thus obtained ranges preferably from 500 to 100,000, more preferably from 1,000 to 50,000, in terms of number-average molecular weight.

The content of the polyester resin in the surface layer ranges from 30 to 98 wt %, preferably from 35 to 95 wt %, with respect to the surface layer. The content of the cured resin preferably ranges between 3 and 50 weight parts, more preferably between 8 and 45 weight parts, and most preferably between 10 and 40 weight parts, with respect to 100 weight parts of the polyester resin. When a silicone graft polymer is contained in the surface layer, the content of the silicone graft polymer is preferably between 0.01 and 10 wt %, more preferably between 0.01 and 5 wt %, with respect to the surface layer. The content of an initiator, when used, is preferably between 0.1 and 50 weight parts, more preferably between 1 and 30 weight parts, for 100 weight parts of the cured resin.

The surface layer may contain, further to the above-mentioned components, a thermoplastic resin such as polycarbonate, polyamide, polyarylate, polyoxymethylene, polyphenylene oxide, polyphenylene sulfide, polyethylene, polypropylene, ethylene-propylene copolymer, polystyrene, styrene-butadiene copolymer, or the like.

The image transfer medium carrier member in accordance with the present invention has the substrate on which the surface layer is formed.

The substrate is preferably made of a film of a resin such as polyester, polycarbonate, polyvinylidene fluoride, Teflon, polyurethane or polyacetate.

The substrate can be formed by, for example, extrusion, injection molding or inflation molding, and may be either single-layered or multi-layered. The volumetric resistivity of this substrate is between $1\times10^2$ to $1\times10^{17}$, while the dielectric constant is preferably 2.5 or greater.

The thickness of the surface layer ranges preferably between 0.1 and 30 μm, more preferably between 0.5 and 20 μm and most preferably between 0.5 and 5 μm. The thickness of the substrate is preferably from 50 to 300 μm, more preferably from 70 to 200 μm.

For the purpose of controlling the conductivity, the surface layer or the substrate may contain a conductive powder, such as a metal powder, e.g., aluminum, copper, nickel, silver or the like, a conductive metal oxide, e.g., indium oxide, antimony oxide, tin oxide or the like; a polymeric conductive material, e.g., polypyrrole, polyaniline or the like;, organic or inorganic electrolyte, carbon black, carbon fiber and graphite.

The surface layer can be formed by preparing a coating solution by dissolving the surface layer components in a solvent, applying the solution to the substrate by, for example, spry coating, Meyer bar coating, dip coating, brush coating, roll coating or the like method, followed by curing by photo-irradiation.

The solvent in which the surface layer components are dissolved may be, for example, cresol, chloroform, dichloroethane, trichloropropane, tetrachlorobenzene, tetrafluoroethanol, hexafluoroisopropanol, or the like, among which tetrafluoroethanol and hexafluoroisopropanol are used most suitably.

The photo-irradiation for curing the surface layer is conducted for a time which is preferably 60 seconds or shorter, more preferably 30 seconds or shorter and most preferably 5 to 15 seconds, with ultraviolet rays of a wavelength of 200 to 500 μm, preferably 300 to 400 μm.

The heat irradiation for curing the surface layer is conducted for a time of 1 to 60 minutes, preferably 10 to 40 minutes, at a temperature of 60° to 300° C., preferably 120 to 200° C.

The image transfer medium carrier sheet of the present invention, when used, is attached to, for example, a cylinder 10 having an opening 10*a* in its outer peripheral surface, as shown in FIG. 1. Although in FIG. 1 part of the image transfer medium carrier member 11 is removed to make the opening 10*a* visible, the opening 10*a* is actually covered entirely by the image transfer medium carrier member 11.

The cylinder 10 is provided with a gripper 15 which is disposed adjacent to the opening 10*a*. The image transfer medium, such as a recording paper sheet or plastic film, is carried by the image transfer carrier member 11, with an end thereof gripped by the gripper 15.

Figure 2:
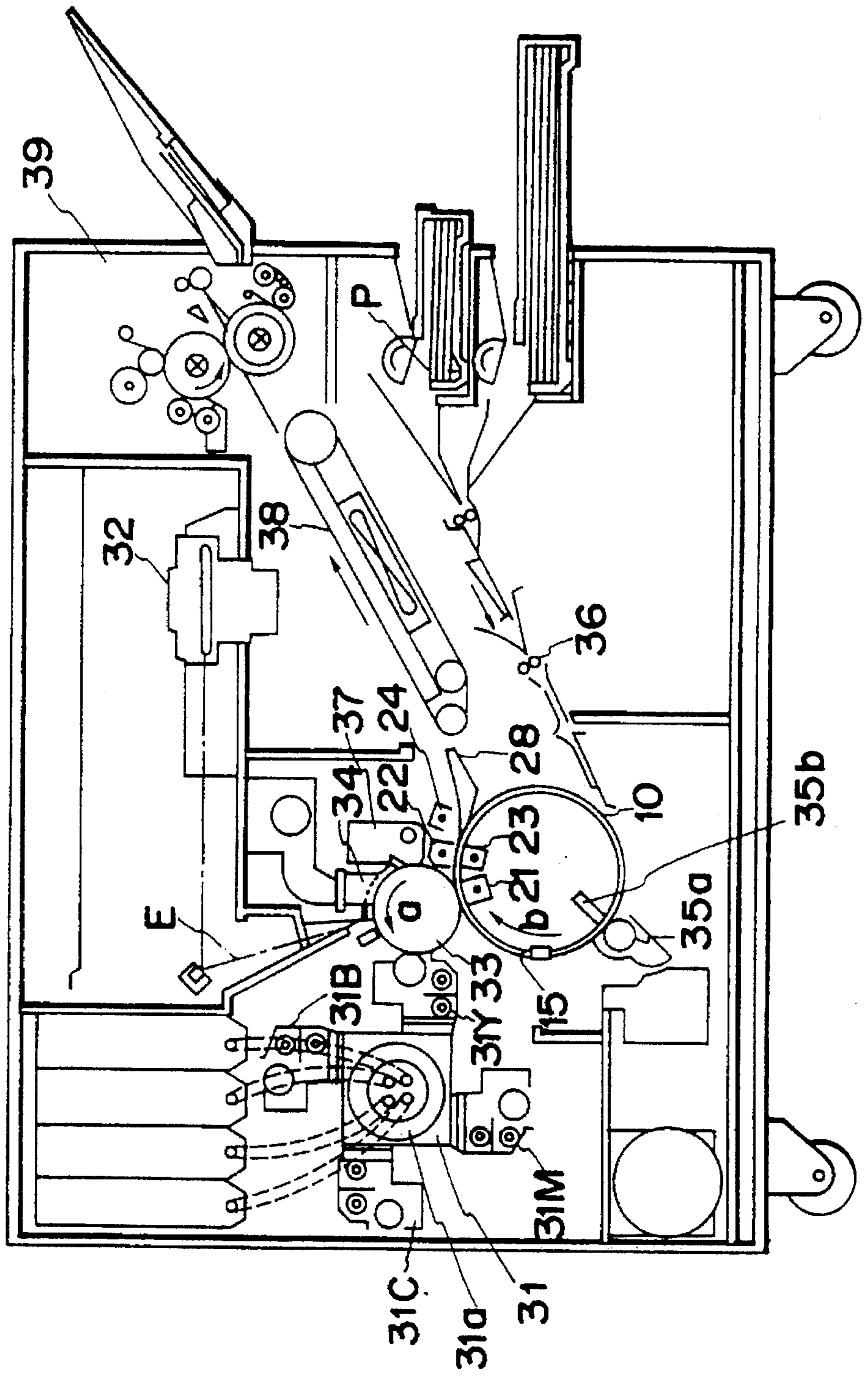
FIG. 2 is a side elevational view of an embodiment of an image forming apparatus of the present invention, incorporating an image transfer medium in accordance with the invention.
Figure 3:
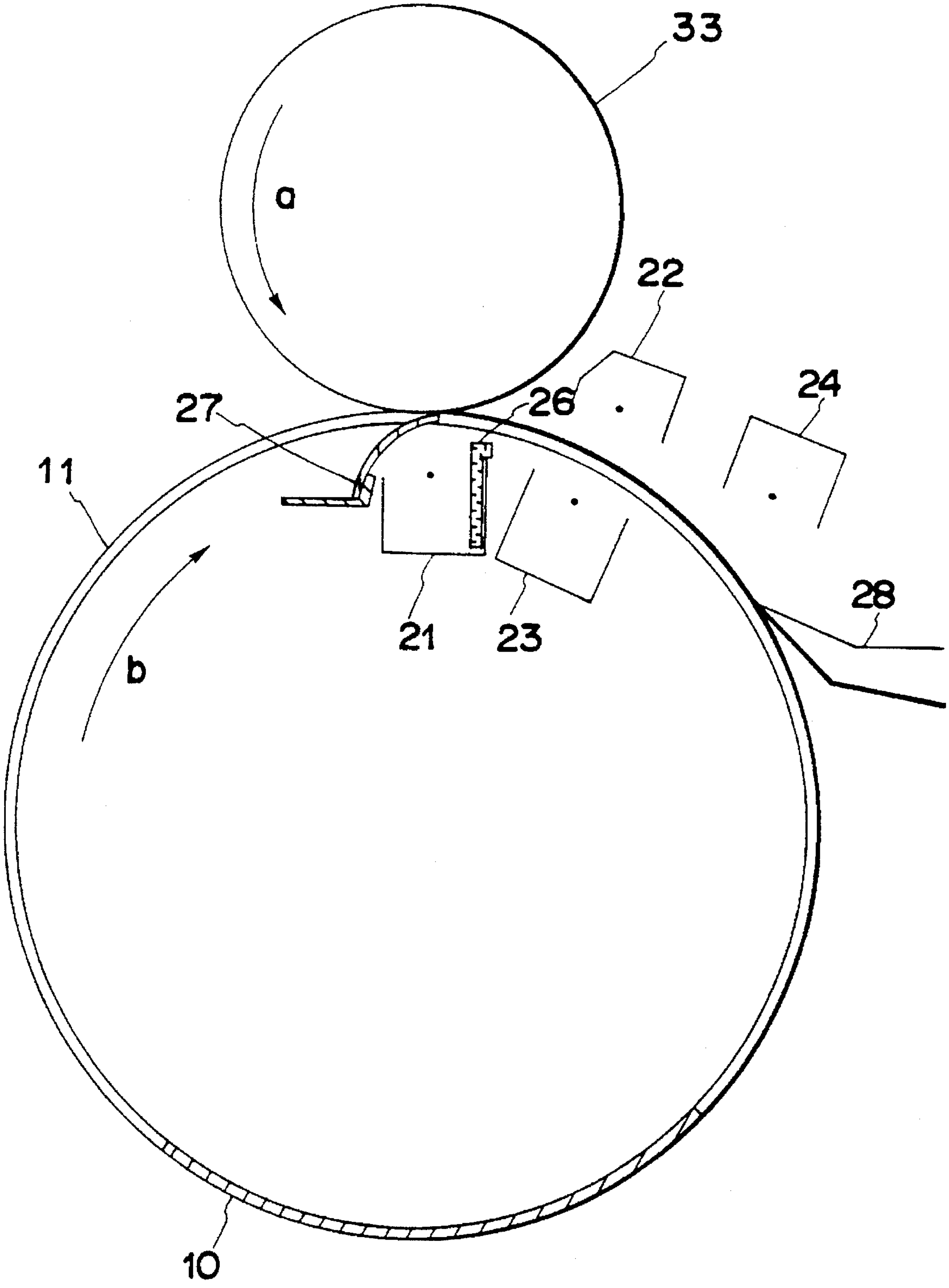
FIG. 3 is a side elevational view of a critical portion of the image forming apparatus of the invention, showing particularly the relationship between an image transfer medium carrier member and an electrophotographic photosensitive member.

FIGS. 2 and 3 illustrate an example of an image forming apparatus having the cylinder 10 to which is attached the image transfer medium carrier member 11. The image forming apparatus shown in FIG. 2 is of the type which has a drum-type photosensitive member as an image carrier.

More specifically, referring to FIG. 2, the rotary drum type photosensitive member, denoted by numeral 33, is adapted to rotate in the direction indicated by an arrow "a". An image forming means is disposed around the photosensitive member 33. The image forming means includes, at least: a primary charger 34 for uniformly charging the surface of the photosensitive member 33; exposure means 32 for irradiating the photosensitive member 33 with image light so as to form an electrostatic latent image on the photosensitive member 33, e.g., a laser beam exposure means; and a rotary developing device 31 for developing the electrostatic latent image on the photosensitive member into visible image.

The rotary developing device 31 has four developing units 31Y, 31M, 31C and 31B which contain developing agents of four different colors, i.e., yellow, magenta, cyan and black, respectively, and a cylindrical housing 31*a* which holds and rotates these four developing units. In operation of the rotary developing device 31, the housing 31 rotates to bring the desired developing unit to a position where it faces the outer peripheral surface of the photosensitive member 33, so as to develop the electrostatic latent image on the photosensitive member 33 by the developing agent contained in the developing unit, whereby a visible image, i.e., a toner image, is obtained on the photosensitive member 33.

The cylinder 10 is disposed adjacent to the photosensitive member 33, and carries a transfer medium P such as a recording paper sheet which has been fed from a sheet feeding section by means of a regist roller 36. A transfer discharger 21 and a charge eliminating discharger 23 are disposed inside the cylinder 10. Charge eliminating dischargers 22 and 24 are disposed outside the cylinder 10.

The photosensitive member 33 rotates in the direction of the arrow "a", while the cylinder 10 rotates in the direction of the arrow "b", so that the toner image on the photosensitive member 33 is brought into contact with the image transfer medium P carried by the image transfer medium carrier member 11. The transfer discharger 21 effects a corona discharge of a polarity opposite to than of the toner, so that the toner image is transferred to the image transfer medium P. When multi-color image is to be formed, the described process is repeated a plurality of times to transfer toner images of different colors.

Removal of electrostatic charge on the image transfer medium P after the transfer of the toner image is effected by the charge eliminating dischargers 22, 23 and 24. The image transfer medium P is than separated from the image transfer medium carrier member 11 by the action of a separator claw 28, and is conveyed by a conveyor belt 38 to a fixing device 39. The fixing device 39 fixes the transferred image by, for example, heat. The image transfer medium now having the image fixed thereon is ejected from the image forming apparatus.

Meanwhile, the cleaning device 37 removes any residual toner on the surface of the photosensitive member 33, thereby cleaning the member 33, to make the latter ready for the formation of the next image.

The surface of the image transfer medium carrier member 11 on the cylinder 10 also is cleaned by a cleaning device 35*a* and an auxiliary cleaning device 35*b*, so a to become ready for the next image forming cycle.

As shown in FIG. 3, the transfer discharger 21 is provided with an insulating member 26 such as a plate of a polycarbonate resin, so that the transfer corona directed to the photosensitive member 33 is enhanced.

A pressing member 27 shown in FIG. 3 is used as required, for the purpose of preventing deformation of the image transfer medium carrier member 11. The pressing member 27 is made of a synthetic resin film having a volumetric resistivity which is preferably $10^{10}$ Ω·cm or higher, more preferably $10^{14}$ Ω·cm or hither, such as, for example, polyethylene, polypropylene, polyester or polyethylene terephthalate.

The image transfer medium carrier member 11 of the invention can have various forms other than the illustrated sheet-like form. For instance, the image transfer medium carrier member 11 can have the form of n endless belt.

Figure 4:
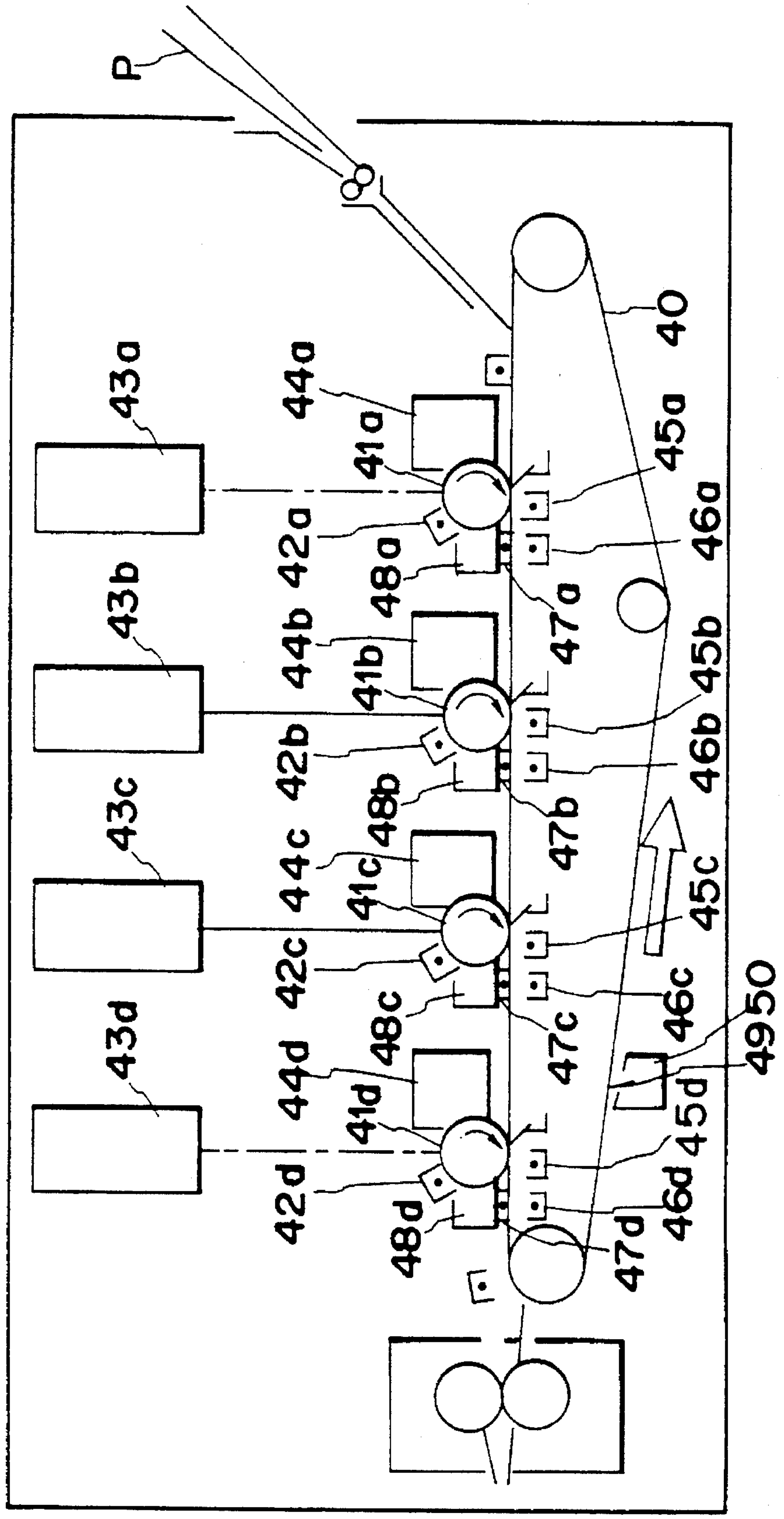
FIG. 4 is a side elevational view of another embodiment of the image forming apparatus of the present invention, incorporating an image transfer medium carrier member of the present invention.

FIG. 4 shows another image forming apparatus in accordance with the present invention. This image forming apparatus has four photosensitive members 41*a*, 41*b*, 41*c* and 41*d*. These photosensitive members 41*a*, 41*b*, 41*c* and 41*d* are respectively surrounded by associated components including primary chargers 42*a*, 42*b*, 42*c* and 42*d*, exposure means 43*a*, 43*b*, 43*c* and 43*d*, developing units 44*a*, 44*b*, 44*c* and 44*d*, transfer dischargers 45*a*, 45*b*, 45*c* and 45*d*, charge eliminating dischargers 46*a*, 46*b*, 46*c* and 46*d*; 47*a*, 47*b*, 47*c* and 47*d*, and photosensitive member cleaning devices 48*a*, 48*b*, 48*c* and 48*d*. An image transfer medium carrier member 40 of the present invention, having the form of an endless belt, is disposed under the photosensitive members 41*a*, 41*b*, 41*c* and 41*d*. Any part of developing agents attaching to the image transfer medium carrier member is removed by a carrier member cleaning device 50 which has an urethane blade 49.

DESCRIPTION OF EXAMPLES

Various forms of the image transfer medium carrier member of the present invention will be described by way of example. In the following description, "parts" and "%" are used to mean weight parts and weight percents, respectively. The melting points of polyester resins in the following description are the values measured by a DSC (Differential Scanning Calorie Meter), at a temperature rise rate of 10° C./min. The quantity of each specimen subjected to the measurement was 5 mg. The specimen was prepared by melting the resin at 280° C., followed by quick cooling with icy water of 0° C.

Example 1

A mixture of 95 parts of a polycarbonate resin, sold from Mitsubishi Gas kagaku Kabushiki Kaisha under the tradename of IUPILON S-2000, and 5 parts of KETJENBLACK EC, sold from KETJENBLACK INTERNATIONAL, was pelletized by a twin extruder with a vent. A substrate of 150 μm was produced by extrusion from the pellets.

Polyethylene terephthalate (intrinsic viscosity 0.70 dl/g, melting point 258° C., glass transition point 70° C.) was prepared by using terephthalic acid as the acid component and ethylene glycol as the glycol component. Then, 100 parts of the polyethylene terephthalate, together with 30 parts of epoxy resin (epoxy equivalent 160; aromatic ester type; sold form Yuka Shell Epoxy Co., Ltd under the tradename of EPICOAT 190p), was dissolved in 740 parts of 1:1 mixture liquid of phenol and hexafluoroisopropanol, thus forming a solution.

Then, 3 parts of triphenylsulfonium hexafluoroantimonate, as a photopolymerization initiator, was added to the above-mentioned solution, thus preparing a coating solution.

The coating solution was then applied to a surface of the substrate and cured by irradiation with light, so that a surface layer of 1.0 μm thick was obtained, whereby an image transfer medium carrier member of the present invention was produced.

The light irradiation was conducted at 130° C. for 8 seconds, by using a 2 kw mercury lamp (30 w/cm) placed at a position 20 cm spaced from the coating film.

In order to evaluate the lubricating nature of this image transfer medium carrier member, slipperiness of this member with respect to the urethane blade under a contact load of 10 g was measured by using a surface performance tester (HEIDON-14, produced by Shinto Kagaku Kabushiki Kaisha). The sensor output was 0.85, normalizing to the output value 1.0 for the polyethylene terephthalate film. The smaller sensor output value indicates the smaller resistance to slip, i.e., greater lubrication.

A test was also conducted for the purpose of evaluating the strength of the surface of the image transfer medium carrier member, in which the amount of wear after 1000 rotations of the member was measured using a taper testing apparatus (produced by Yasuda Seiki Seisakusho, 7 μm lapping film). The measured amount of wear of the image transfer medium carrier member was 0.97 mg.

This image transfer medium carrier member was attached to the cylinder 10 so as to cover the opening 10*a* as shown in FIG. 1. This cylinder 10 was then mounted on the image forming apparatus shown in FIG. 2.

The material of the cylinder 10 was aluminum, and the length and outside diameter were 380 mm and 160 mm, respectively. The dimensions of the opening 10*a* was such that, assuming that the outer peripheral surface of the cylinder 10 is developed into a plane, the length of the edge parallel to the axis of the cylinder 10 is 350 mm and the other edge, i.e., the edge perpendicular to the axis, is 450 mm.

The image forming apparatus was so constructed that the width of opening of the transfer discharger 21 was 19 mm, the distance between the discharge wire of the transfer discharger 21 and the outer peripheral surface of the photosensitive member 33 was 10.5 mm, and the distance between the discharge wire of the transfer discharger 21 and the bottom surface of the shield plate of the transfer corona discharger 21 was 16 mm. A polyethylene terephthalate resin film was used as the pressing member 27.

An endurance test was conducted by using this image forming apparatus. In the test, a monochromatic image was formed on 10,000 consecutive image transfer medium sheets to enable evaluation of durability of the image transfer medium carrier member. The image forming process was conducted by charging the photosensitive member 33 in negative polarity, exposing the charged photosensitive member to an image light, and invert-developing the latent image with a toner having a mean particle size of 8 μm. The peripheral speeds of the photosensitive member 33 and the cylinder 10 were 160 mm/sec. The results of the endurance test are shown in Table 1.

Example 2

An image transfer medium carrier member of the invention was produced by the same process as Example 1 except that the polyester resin used in Example 1 was substituted by a polyester resin which was prepared by using terephthalic acid as the acidic component and a mixture of 63% of ethylene glycol and 37% of polyethylene glycol as the glycol component. This polyester resin had an intrinsic viscosity of 0.67 dl/g, melting point of 195° C. and a glass transition temperature of 65° C. This image transfer medium carrier member was subjected to the same endurance test as Example 1 to obtain results as shown in Table 1.

Example 3

An image transfer medium carrier member of the invention was produced by the same process as Example 1 except that the polyester resin used in Example 1 was substituted by a polyester resin which was prepared by using terephthalic acid as the acidic component and a mixture of 40% of ethylene glycol and 60% of polyethylene glycol as the glycol component. This polyester resin had an intrinsic viscosity of 0.64 dl/g, melting point of 161° C. and a glass transition temperature of 60° C. This image transfer medium carrier member was subjected to the same endurance test as Example 1 to obtain results as shown in Table 1.

Example 4

An image transfer medium carrier member of the invention was produced by the same process as Example 1 except that the amount of the epoxy resin and the thickness of the surface layer were respectively changed to 10 parts and 0.8 μm, and was subjected to the same endurance test was Example 1 to obtain the results as shown in Table 1.

Example 5

100 parts of the same polyethylene terephthalate as that used in Example 1, together with 30 parts of an epoxy resin (epoxy equivalent 184–194; bisphenol type; tradename EPICOAT 828, sold from Yuka Shell Epoxy Co., Ltd.), was dissolved in 740 parts of 1:1 mixture liquid of phenol and hexafluoroisopropanol to form a solution.

Then, 9 parts of phthalic anhydride as heat-polymerization initiator was added to the solution, whereby a coating solution was prepared.

The coating solution was applied by spraying to each side of a substrate which was the same as that used in Example 1. The coating solution thus applied was heat-cured to form a surface layer of 1.0 μm, thus completing an image transfer medium carrier member of the present invention. Thus, in this Example, surface layers were formed on both sides of the image transfer medium carrier members. The heat polymerization was conducted in two steps: 1-hour heating at 120° C. and 1-hour heating at 180° C.

The image transfer medium carrier member thus obtained was subjected to the same evaluation as Example 1 to obtain the results as shown in Table 1.

Comparative Example 1

The substrate used in Example 1 alone, i.e., without any surface layer, was used as the image transfer medium carrier member and tested and evaluated in the same way as Example 1 to obtain the results as shown in Table 2.

Comparative Example 2

4 parts of polycarbonate resin (tradename IUPILON S-2000, produced by Mitsubishi Gas Kagaku Kabushiki Kaisha), 70 parts of monochlorobenzene and 1 part of PTFE fine powder was mixed in a sand mill for 10 hours, whereby a coating solution was prepared. This coating solution was applied by spraying to a substrate which was the same as that used in Example 1 so as to provide a thickness of 1.0 μm after drying, whereby an image transfer medium carrier member was obtained. The member was subjected to the same evaluation as Example 1 to obtain the results as shown in Table 2.

Example 6

An image transfer medium carrier member of the present invention was produced by the same process as Example 1 except that the substrate was prepared by using, in place of the polycarbonate resin (IUPILON S-2000, produced by Mitsubishi Gas Kagaku Kabushiki Kaisha), a bisphenol Z polycarbonate (viscosity-average molecular weight 2,800). This image transfer medium carrier member was evaluated in the same way as Example 1 to obtain the results as shown in Table 1.

This image transfer medium carrier member was formed into an endless belt by heat-welding opposite ends of the member such that the surface layer faces outward the loop of the endless belt. This member in the form of endless belt was mounted in the multi-color image forming apparatus of the type shown in FIG. 4 and was used in image forming operation employing the same toner as Example 1. Consequently, images of excellent quality without any transfer unevenness was obtained.

An endurance test also was conducted in the above-mentioned multi-color electrophotographic copying apparatus, in which a multi-color image was formed on 10000 consecutive image transfer medium sheets. It was confirmed that image of excellent quality, without any unevenness as in the initial image, is obtainable even after the endurance.

Example 7

A polybutyleneterephthalate (PBT) (intrinsic viscosity 0.72 dl/g, melting point 224° C., glass transition temperature 35° C.) was prepared by using terephthalic acid as the acidic component and 1,4-tetramethylene glycol as the glycol component. 100 parts of this polybutyleneterephthalate, together with 30 parts of epoxy resin which was the same as that use din Example 1, was dissolved in 740 parts of 1:1 mixture liquid of phenol and hexafluoroisopropanol, thus forming a solution. Then, 3 parts of triphenylsulfonium hexafluoroantimonate, as a photo-polymerization initiator, was added to the above-mentioned solution, whereby a coating solution was prepared.

This coating solution was sprayed to a substrate which was the same as that used in Example 6, and was cured under the same light irradiating conditions as Example 1, so that a surface layer of 1.5 μm thick was obtained, whereby an image transfer medium carrier member of the invention was produced. This carrier member was evaluated in the same way as Example 1 to obtain the results as shown in Table 1.

Example 8

A mixture was formed from 60 parts of hexamethylene diisocyanate (CORONATE 2507, sold from Nippon Urethane Kogyo Kabushiki kaisha), 34 parts of polyester polyol (NIPPOLLAN 800, sold from Nippon Polyurethane Kogyo Kabushiki kaisha), 6 parts of KETJENBLACK EC (produced by KETJENBLACK international), 10 parts of methyl cellosolve and 10 parts of methylethylketone, and the mixture thus formed was dispersed for 20 hours in a sand mill. The dispersion liquid was then subjected to a 2-hour curing treatment conducted at 140° C. by using centrifugal molding method, thus forming an endless-belt type substrate having a thickness of 130 μm and a diameter of 600 mm.

A surface layer was formed on this substrate so as to complete an image transfer medium carrier member of the invention, by the same process as Example 1 except that the process employed a polycyclohexane dimthyleneterephthalate (PCT), having an intrinsic viscosity of 0.66 dl/g, melting point of 290° C. and glass transition temperature of 80° C., prepared by using terephthalic acid as the acidic component an cyclohexanedimethylol as the glycol component.

This image transfer medium carrier member was evaluated in the same way as Example 1. The endurance test in which image was formed on 10,000 consecutive image transfer medium sheets was executed by using the apparatus shown in FIG. 4, as was the case of Example 7. The results are shown in Table 1.

Comparative Example 3

The substrate of Example 8 alone, i.e., without the surface layer, was used as the image transfer medium carrier member and was evaluated in the same way as Example 8, the results being shown in Table 2.

TABLE 1

| | LUBRICATION | TAPER WEAR AMOUNT [mg] | INITIAL IMAGE | IMAGE AFTER ENDURANCE |
|---|---|---|---|---|
| Example 1 | 0.85 | 0.97 | Good | Good |
| Example 2 | 0.96 | 1.03 | Good | Good |
| Example 3 | 0.88 | 1.13 | Good | Good |
| Example 4 | 0.91 | 1.02 | Good | Good |
| Example 5 | 0.87 | 0.92 | Good | Good |
| Example 6 | 0.89 | 1.09 | Good | Good |
| Example 7 | 1.02 | 1.18 | Good | Good |
| Example 8 | 0.99 | 1.21 | Good | Good |

TABLE 2

| | LUBRICATION | TAPER WEAR AMOUNT [mg] | INITIAL IMAGE | IMAGE AFTER ENDURANCE |
|---|---|---|---|---|
| Comparative Example 1 | 2.31 | 6.50 | Transfer unevenness observed | Transfer unevenness enhanced |
| Comparative Example 2 | 1.56 | 6.79 | Transfer unevenness observed | Transfer unevenness enhanced |
| Comparative Example 3 | 2.10 | 7.78 | Transfer unevenness observed | Transfer unevenness enhanced |

Example 9

A coating solution as the material of the surface layer was prepared by adding, to the same coating solution as that used in Example 1, 2 parts of silicone graft polymer which was prepared as follows.

Namely, the silicone graft polymer was formed from 30 parts of a denaturated silicone and 70 parts of methylmethacrylate, the denaturated silicone being formed through condensation reaction of the composition No. 1 (j=30) as the composition of the general formula (I) and the composition No. 48 as a composition of the general formula (III).

The coating solution thus obtained as the material of the surface layer was applied by spraying to a surface of a substrate which was the same as that used in Example 1, followed by photo-curing conducted under the same conditions as Example 1, whereby a surface layer of 1.2 μm thick was obtained to complete an image transfer medium carrier member in accordance with the present invention.

This image transfer medium carrier member was subjected to the same evaluation as Example 1, the results being shown in Table 3.

Example 10

An image transfer medium carrier member in accordance with the present invention was produced in the same process as Example 9, except that the process employed a polyester resin (intrinsic viscosity 0.68 dl/g, melting point 210° C., glass transition temperature 68° C.), prepared by using terephthalic acid as the acidic composition and a mixture of 80% of ethylene glycol and 20% of polyethylene glycol as the glycol component, and a silicone graft polymer which was prepared as follows.

Namely, in this example, the silicone graft polymer was synthesized from 30 parts of a denaturated silicone and 80 parts of methylmethacrylate, the denaturated silicone being formed through condensation reaction of the compound No. 2 (j=30) as the compound of the general formula (I) and the compound No. 47 as the compound of the general formula (III).

This image transfer medium carrier member was subjected to the same evaluation as Example 1, the results being shown in Table 3.

Example 11

An image transfer medium carrier member in accordance with the present invention was produced in the same process as Example 9, except that the process employed a polyester resin (intrinsic viscosity 0.66 dl/g, melting point 180° C., glass transition temperature 64° C.), prepared by using terephthalic acid as the acidic composition and a mixture of 50% of ethylene glycol and 50% of polyethylene glycol as the glycol component.

This image transfer medium carrier member was subjected to the same evaluation as Example 1, the results being shown in Table 3.

Example 12

An image transfer medium carrier member in accordance with the present invention was produced in the same process as Example 9, except that the process employed a polyester resin (intrinsic viscosity 0.64 dl/g, melting point 161° C., glass transition temperature 60° C.), prepared by using terephthalic acid as the acidic composition and a mixture of 40% of ethylene glycol and 60% of polyethylene glycol as the glycol component, and 3 parts of the silicone graft polymer which was prepared as follows.

Namely, in this example, the silicone graft polymer was synthesized from 30 parts of a denaturated silicone, 30 parts of styrene and 50 parts of methylmethacrylate, the denaturated silicone being formed through condensation reaction of the compound No. 26 (j=300) as the compound of the general formula (I) and the compound No. 58 as the compound of the general formula (III).

This image transfer medium carrier member was subjected to the same evaluation as Example 1, the results being shown in Table 3.

Example 13

A coating solution as the material of the surface layer was prepared by adding 3 parts of the silicone graft polymer which was the same as that used in Example 12 to the same coating solution as that prepared in Example 15. The surface coating solution thus prepared was applied to the same substrate a Example 5, whereby an image transfer medium carrier member was obtained.

This image transfer medium carrier member was subjected to the same evaluation as Example 1, the results being shown in Table 3.

Example 14

An image transfer medium carrier member of the present invention was produced by the same process as Example 9 except that the substrate was prepared by using, in place of the polycarbonate resin (IUPILON S-2000, produced by Mitsubishi Gas Kagaku Kabushiki Kaisha), a bisphenol Z polycarbonate (viscosity-average molecular weight 2,800). This image transfer medium carrier member was evaluated in the same way as Example 9 to obtain the results as shown in Table 3.

This image transfer medium carrier member was formed into an endless belt by heat-welding opposite ends of the member such that the surface layer faces outward the loop of the endless belt. This member in the form of endless belt was mounted in the multi-color image forming apparatus of the type shown in FIG. 4 and was used in image forming operation employing the same toner as Example 9. Consequently, images of excellent quality without any transfer unevenness was obtained.

An endurance test also was conducted in the above-mentioned multi-color electrophotographic copying apparatus, in which a multi-color image was formed on 10000 consecutive image transfer medium sheets. It was confirmed that image of excellent quality, without any unevenness as in the initial image, is obtainable even after the endurance.

Example 15

A coating solution as the material of the surface layer was prepared by adding, to the sam coating solution as that used in Example 7, 2 parts of silicone graft polymer which was prepared as follows.

Namely, the silicone graft polymer was formed from 15 parts of a denaturated silicone and 85 parts of styrene, the denaturated silicone being formed through condensation reaction of the composition No. 7 (j=30) as the composition of the general formula (I) and the composition No. 63 as a composition of the general formula (III).

The coating solution thus obtained as the material of the surface layer was applied by spraying to a surface of a substrate which was the same as that used in Example 14, followed by photo-curing conducted under the same conditions as Example 1, whereby a surface layer of 1.5 μm thick was obtained to complete an image transfer medium carrier member in accordance with the present invention.

This image transfer medium carrier member was subjected to the same evaluation as Example 1, the results being shown in Table 3.

Example 16

An image transfer medium carrier member in accordance with the present invention was produced in the same process as Example 9, except that the process employed, as the polyester resin, polyethylene naphthalate (PEN) resin (intrinsic viscosity 0.69 dl/g, melting point 280° C., glass transition temperature 85° C.), composed of 1,10-naphthalene dicarboxylic acid and ethylene glycol, and, s the substrate, an endless-belt type substrate of the type used in Example 8.

This image transfer medium carrier member was evaluated in the same way as Example 1 to obtain the results as shown in Table 3.

TABLE 3

| | LUBRICATION | TAPER WEAR AMOUNT [mg] | INITIAL IMAGE | IMAGE AFTER ENDURANCE |
|---|---|---|---|---|
| Example 9 | 0.76 | 0.90 | Good | Good |
| Example 10 | 0.80 | 0.90 | Good | Good |
| Example 11 | 0.81 | 1.05 | Good | Good |
| Example 12 | 0.73 | 1.03 | Good | Good |
| Example 13 | 0.89 | 0.89 | Good | Good |
| Example 14 | 0.75 | 0.92 | Good | Good |
| Example 15 | 0.88 | 0.88 | Good | Good |
| Example 16 | 0.91 | 0.96 | Good | Good |

As will be understood from the foregoing description, the image transfer medium carrier member of the present invention has a surface layer formed on a substrate, the surface layer containing a polyester resin, a cured resin and, as required, a silicone graft polymer. Consequently, the carrier member of the invention excels in lubrication or slipperiness, mechanical strength, wear resistance and electric characteristics. Therefore, the image forming apparatus of the present invention, which employs this image transfer medium carrier member, is capable of performing image transfer to the medium stably and in good conditions, even after repeated use of the image transfer medium carrier member, thus ensuring high quality of the product image over a long period of use.

What is claimed is:

1. An image transfer medium carrier member, comprising a substrate and a surface layer, said surface layer containing a polyester resin, a cured resin, and a silicone graft polymer.

2. An image transfer medium carrier member according to claim 1, wherein said silicone graft polymer is a product which is obtained through copolymerization of a denaturated silicone having a silicon in its side chain and a polymerizable functional group at its end and a compound having a polymerizable functional group.

3. An image transfer medium carrier member according to claim 2, wherein said denaturated silicone is a product of a condensation reaction between a composition expressed by the following general formulae (I) or (II) and a composition expressed by the following general formula (III):

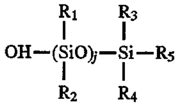

(I)

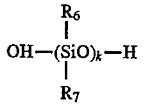

(II)

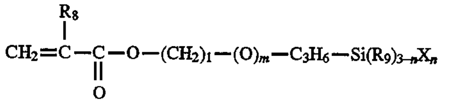

(III)

wherein R1 to R7 and R9 each is an alkyl group or an aryl group, R8 indicates a hydrogen atom, an alkyl group, an aryl group or an aralkyl group, X indicates a halogen atom or an alkoxy group, j and k each indicates a positive integer, l indicates a integer from 0 to 10, m indicates 0 or 1, and n indicates a integer from 1 to 3.

4. An image transfer medium carrier member according to claim 1, wherein said polyester resin has an intrinsic viscosity not smaller than 0.4 dl/g.

5. An image transfer medium carrier member according to claim 1, wherein said polyester resin is a polyalkylene terephthalate resin or a polyalkylene naphthalate resin.

6. An image transfer medium carrier member according to claim 1, wherein said cured resin is cured from a cation-curable resin.

7. An image forming apparatus, comprising:

an electrophotographic photosensitive member;

charging means for electrostatically charging said electrophotographic photosensitive member;

image exposure means for exposing said electrophotographic photosensitive member to an image light so as to form an electrostatic latent image in said electrophotographic photosensitive member;

developing means for developing said electrostatic latent image with a toner so as to produce a toner image; and an image transfer medium carrier member of comprising a substrate and a surface layer, the surface layer containing a polyester resin and a cured resin, for carrying an image transfer medium to which said toner image is to be transferred.

8. An image forming apparatus according to claim 7, wherein said surface layer further contains a silicone graft polymer.

* * * * *

UNITED STATES PATENT AND TRADEMARK OFFICE

CERTIFICATE OF CORRECTION

PATENT NO. : 5,629,094

DATED : May 13, 1997

INVENTOR(S) : Teigo SAKAKIBARA, et al.

It is certified that error appears in the above-indentified patent and that said Letters Patent is hereby corrected as shown below:

Title Page, Attorney, etc., after "Cella", insert a comma (",");
Abstract, [57], delete "containing" and insert therefor --contains--.

Column 2, line 24, delete "a", second occurrence, and insert therefor --as--.

Column 3, line 4, delete "an" and insert therefor --and--;
Line 29, after "suitably", insert --be--.

Column 4, line 15, delete "hisphenol" and insert therefor --bisphenol--.

Column 17, line 14, delete "solutio" and insert therefor --solution--.

Column 18, line 4, delete "spry" and insert therefor --spray--;
Line 57, delete "31" and insert therefor --31a--.

UNITED STATES PATENT AND TRADEMARK OFFICE

CERTIFICATE OF CORRECTION

PATENT NO. : 5,629,094
DATED : May 13, 1997
INVENTOR(S) : Teigo SAKAKIBARA, et al.

It is certified that error appears in the above-indentified patent and that said Letters Patent is hereby corrected as shown below:

Column 19, line 32, delete "a" and insert therefor --as--;
Line 50, delete "n" and insert therefor --an--;
Line 67, delete "an" and insert therefor --a--.

Column 20, line 16, delete "kagaku" and insert therefor --Kagaku--;
Line 28, delete "form" and insert therefor --from--.

Column 22, 53, after "outward", insert --from--;
Line 59, delete "was" and insert therefor --were--.

Column 23, line 8, delete "use din" and insert therefor --used in--;
Line 65, delete "dimthyleneterephtha" and insert therefor --dimethyleneterephtha--.

UNITED STATES PATENT AND TRADEMARK OFFICE

CERTIFICATE OF CORRECTION

PATENT NO. : 5,629,094

DATED : May 13, 1997

INVENTOR(S) : Teigo SAKAKIBARA, et al.

It is certified that error appears in the above-indentified patent and that said Letters Patent is hereby corrected as shown below:

Column 26, line 17, after "outward", insert --from--;
Line 23, delete "was" and insert therefor --were--;
Line 34, delete "sam" and insert therefor --same--;
Line 62, delete "s" and insert therefor --as--.

Column 28, line 16, delete "R8" and insert therefor --$R_8$--;
Line 18, delete "indicates" and insert therefor --indicate--;
Line 20, delete "a" and insert therefor --an--;
Line 46, delete "of".

Signed and Sealed this

Twenty-eighth Day of October, 1997

Attest:

BRUCE LEHMAN

*Attesting Officer* *Commissioner of Patents and Trademarks*